US012038979B2

(12) United States Patent
Seth et al.

(10) Patent No.: US 12,038,979 B2
(45) Date of Patent: Jul. 16, 2024

(54) METADATA INDEXING FOR INFORMATION MANAGEMENT USING BOTH DATA RECORDS AND ASSOCIATED METADATA RECORDS

(71) Applicant: International Business Machines Corporation, Armonk, NY (US)

(72) Inventors: Abhishek Seth, Deoband (IN); Soma Shekar Naganna, Bangalore (IN); Randy Hu, Austin, TX (US); James Albert O'Neill, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 17/105,425

(22) Filed: Nov. 25, 2020

(65) Prior Publication Data

US 2022/0164396 A1    May 26, 2022

(51) Int. Cl.
*G06F 16/903* (2019.01)
*G06F 16/901* (2019.01)
*G06F 16/908* (2019.01)

(52) U.S. Cl.
CPC .... *G06F 16/90344* (2019.01); *G06F 16/9014* (2019.01); *G06F 16/908* (2019.01)

(58) Field of Classification Search
CPC .......... G06F 16/90344; G06F 16/9014; G06F 16/908

(Continued)

(56) References Cited

U.S. PATENT DOCUMENTS 5,319,779 A * 6/1994 Chang ................. G06F 16/2237
5,511,190 A * 4/1996 Sharma ............. G06F 16/24556
(Continued)

FOREIGN PATENT DOCUMENTS

CN       106612320 A      5/2017
CN       109075971 A     12/2018
WO   WO-2019099558 A1 *  5/2019 .......... G06F 11/3476

OTHER PUBLICATIONS

Mell et al., "The NIST Definition of Cloud Computing," National Institute of Standards and Technology, U.S. Department of Commerce, NIST Special Publication 800-145, Sep. 2011, 7 pages.

(Continued)

*Primary Examiner* — Tony Mahmoudi
*Assistant Examiner* — Michael Le
(74) *Attorney, Agent, or Firm* — Yee & Associates, P.C.

(57) ABSTRACT

A method, apparatus, computer system, and computer program product for managing information. A set of bucket hashes and comparison information for a data record are identified by a computer system. The set of bucket hashes is generated from the comparison information, wherein the set of bucket hashes and the comparison information form a metadata record. A number of candidate metadata records in a metadata database is identified by the computer system using the set of bucket hashes, wherein the number of candidate metadata records comprises a set of candidate bucket hashes and candidate comparison information. An entity membership is identified by the computer system for the data record from a comparison of the comparison information in the metadata record with the candidate comparison information in the number of candidate metadata records.

16 Claims, 10 Drawing Sheets

(58) Field of Classification Search
USPC .......................................................... 707/758
See application file for complete search history.

(56) References Cited

U.S. PATENT DOCUMENTS

| | | | | |
|---|---|---|---|---|
| 5,819,291 | A * | 10/1998 | Haimowitz | G06F 16/9014 |
| | | | | 707/999.005 |
| 6,360,215 | B1 * | 3/2002 | Judd | G06F 16/951 |
| | | | | 707/999.009 |
| 6,701,314 | B1 * | 3/2004 | Conover | G06F 16/951 |
| | | | | 707/E17.09 |
| 7,472,114 | B1 * | 12/2008 | Rowney | G06F 16/334 |
| 7,831,789 | B1 * | 11/2010 | Per | G06F 11/1451 |
| | | | | 707/625 |
| 8,359,339 | B2 * | 1/2013 | Adams | G06F 16/221 |
| | | | | 707/805 |
| 8,874,842 | B1 * | 10/2014 | Kimmel | G06F 3/0665 |
| | | | | 711/100 |
| 8,880,787 | B1 * | 11/2014 | Kimmel | G06F 16/128 |
| | | | | 711/170 |
| 8,935,211 | B2 * | 1/2015 | Orenstein et al. | G06F 17/30 |
| | | | | 707/646 |
| 9,401,959 | B1 | 7/2016 | Lai et al. | |
| 9,600,602 | B2 | 3/2017 | Natarajan et al. | |
| 9,727,665 | B2 * | 8/2017 | Luo | G06F 16/24578 |
| 9,904,793 | B2 * | 2/2018 | Chow | G06F 16/22 |
| 9,996,607 | B2 | 6/2018 | Alexe et al. | |
| 10,452,627 | B2 | 10/2019 | Kabra et al. | |
| 10,936,585 | B1 * | 3/2021 | Echeverria | G05B 13/00 |
| 10,983,983 | B2 * | 4/2021 | Kallas | G06F 16/2365 |
| 11,157,497 | B1 * | 10/2021 | Batsakis | G06F 16/24539 |
| 2005/0038784 | A1 * | 2/2005 | Zait | G06F 16/22 |
| | | | | 707/999.005 |
| 2006/0218123 | A1 * | 9/2006 | Chowdhuri | G06F 16/24532 |
| 2007/0100873 | A1 * | 5/2007 | Yako | G06F 16/2255 |
| | | | | 707/999.102 |
| 2009/0012957 | A1 * | 1/2009 | Villaret | G06F 7/02 |
| 2009/0083545 | A1 * | 3/2009 | Heim | G06F 21/6263 |
| | | | | 707/E17.014 |
| 2009/0089630 | A1 * | 4/2009 | Goldenberg | G06F 16/2462 |
| | | | | 714/704 |
| 2010/0306193 | A1 * | 12/2010 | Pereira | G06F 16/7328 |
| | | | | 707/E17.014 |
| 2010/0325181 | A1 * | 12/2010 | Skillcorn | G06F 16/13 |
| | | | | 707/829 |
| 2011/0010401 | A1 * | 1/2011 | Adams et al. | 707/805 |
| 2011/0078152 | A1 * | 3/2011 | Forman | G06F 16/325 |
| | | | | 707/E17.058 |
| 2013/0097157 | A1 * | 4/2013 | Ng et al. | 707/723 |
| 2013/0279806 | A1 * | 10/2013 | Tonisson | G06F 16/56 |
| | | | | 382/173 |
| 2013/0339390 | A1 * | 12/2013 | Muller et al. | G06F 17/30943 |
| | | | | 707/782 |
| 2014/0281729 | A1 | 9/2014 | Goldenberg et al. | |
| 2014/0317093 | A1 * | 10/2014 | Sun | G06F 16/2255 |
| | | | | 707/747 |
| 2015/0227624 | A1 * | 8/2015 | Busch | G06F 16/951 |
| | | | | 707/728 |
| 2015/0278397 | A1 * | 10/2015 | Hendrickson et al. | |
| | | | | G06F 17/30958 |
| 2016/0004742 | A1 * | 1/2016 | Mohan | G06F 16/215 |
| | | | | 707/694 |
| 2016/0357743 | A1 * | 12/2016 | Swaminathan | G06F 16/182 |
| 2017/0255710 | A1 * | 9/2017 | Luo | G06F 16/24565 |
| 2018/0365123 | A1 * | 12/2018 | Shani | G06F 11/26 |
| 2020/0026949 | A1 * | 1/2020 | Alcock | G06V 10/40 |
| 2020/0117681 | A1 * | 4/2020 | Greenlee | G06F 16/152 |
| 2020/0177640 | A1 | 6/2020 | Hummel | |
| 2020/0387490 | A1 * | 12/2020 | Schulze | G06F 16/2228 |
| 2021/0117251 | A1 * | 4/2021 | Cristofi | G06F 9/542 |
| 2021/0165760 | A1 * | 6/2021 | De Schrijver | G06F 16/1734 |
| 2021/0165767 | A1 * | 6/2021 | D'Halluin | G06F 16/1734 |
| 2021/0165768 | A1 * | 6/2021 | D'Halluin | G06F 16/27 |
| 2021/0232559 | A1 * | 7/2021 | Frese | G06F 16/285 |

OTHER PUBLICATIONS

"Probabilistic Matching in IBM InfoSphere Master Data Management", IBM, retrieved from the Internet on Jun. 2, 2020, 13 pages, https://www.ibm.com/support/pages/probabilistic-matching-ibm-infosphere-master-data-management.

International Search Report and Written Opinion of the International Searching Authority dated Jan. 26, 2022, regarding application No. PCT/CN2021/125194, 10 pages.

* cited by examiner

FIG. 6

| INTERNAL RECORD IDENTIFIER | SOURCE IDENTIFIER | BUCKET HASHES | COMPARISON STRING | ENTITY MEMBERSHIP | TEXT SEARCH |
|---|---|---|---|---|---|
| 360 | CRM: 18547 46215 | 1174511359022358000  1227089842786234400  1373378801212099600  1400151909353739000<br>1419802906789598500  1489592228914168300  1501792794988366300  1537707110668576000<br>1546105285779506700  1591778752255404000  1616984335794584800  1618556258443556600<br>1650636013851358700  1701580606445100500  1740052654578415400  1751379823369974300<br>1756037041592972500  1789826475620143400  1822447205564611800  1850840574598746400<br>1868277561389568000  1879365540187018500  1928975270707821600  1955748378849461200<br>2011758254746745600  2023230559073228500  2074838303643683600  2102039056895513000<br>2246095650504021200  2273013894180584400  2350865236978031000  2737649404371388000<br>2822747564538451000  2849525070726603300  3259346577656216000  3490129728479831000<br>3493821888526606300  3591396483240863000  3639229890018449000  3647909540106201600<br>3700492750209315000  3719630849606170600  3745398580260358000  3786958149659168300<br>3932568963676450000  3932918510623512600  3952762387758442000  3999570356210709500<br>4017353804779677000  4052007919206283300  4095770847704136700  4126663237064712000<br>4196163214619415000  4199008889761725400  4199345466244284400  4210511980413798400<br>4355970889106307600  4367438795386278000  4581435917057523000  4584095520811021000<br>5799322685826675000  5817182071441256000  5874735589362328000  5976086763302716000<br>5979980619741554000  5991488108440140000  6050029335219703000  6094726090077298000<br>6119685410763051000  6231998788890080000  6258621159543309000  6362947232803334000<br>6449035604234139000  6488938980284961000  6671846218293345000  6675824251363456000<br>6713977614157991000  6725304782949550000  6742729735247271000  6795412234227117000<br>6803810409338049000  6844003791413035800  6863145227201624000  6928298699724894000<br>7055185998209176000  7112485302972747000  7395434091235080000  7509112038320502000<br>7513085673344099000  7680138056002722000  8030255460050398000 | RAMOS:NELLIE::<br>^10162:~26812^N-<br>3696:S-E:N-84:S-TH:<br>S-AVE.S-NEW:<br>S:YORK:S-NY:<br>.N-10162:.~N-8866:<br>S-W:SMOUNT:<br>S-VERNON:S-ST:<br>.SMATHIAS:S-WV:<br>.N-26812:.^815944600<br>^5219493~581470<br>5^19300307^F^^<br>^861114462 | 4104 | NELLIE RAMOS F<br>1930-03-07<br>861-11-4462<br>815-94-4600<br>8866 W MOUNT<br>VERNON STREET<br>MATHIAS WV 26812<br>3696 E 84 TH<br>AVENUE NEW YORK<br>NY 10162 581-4705<br>521-9493 |

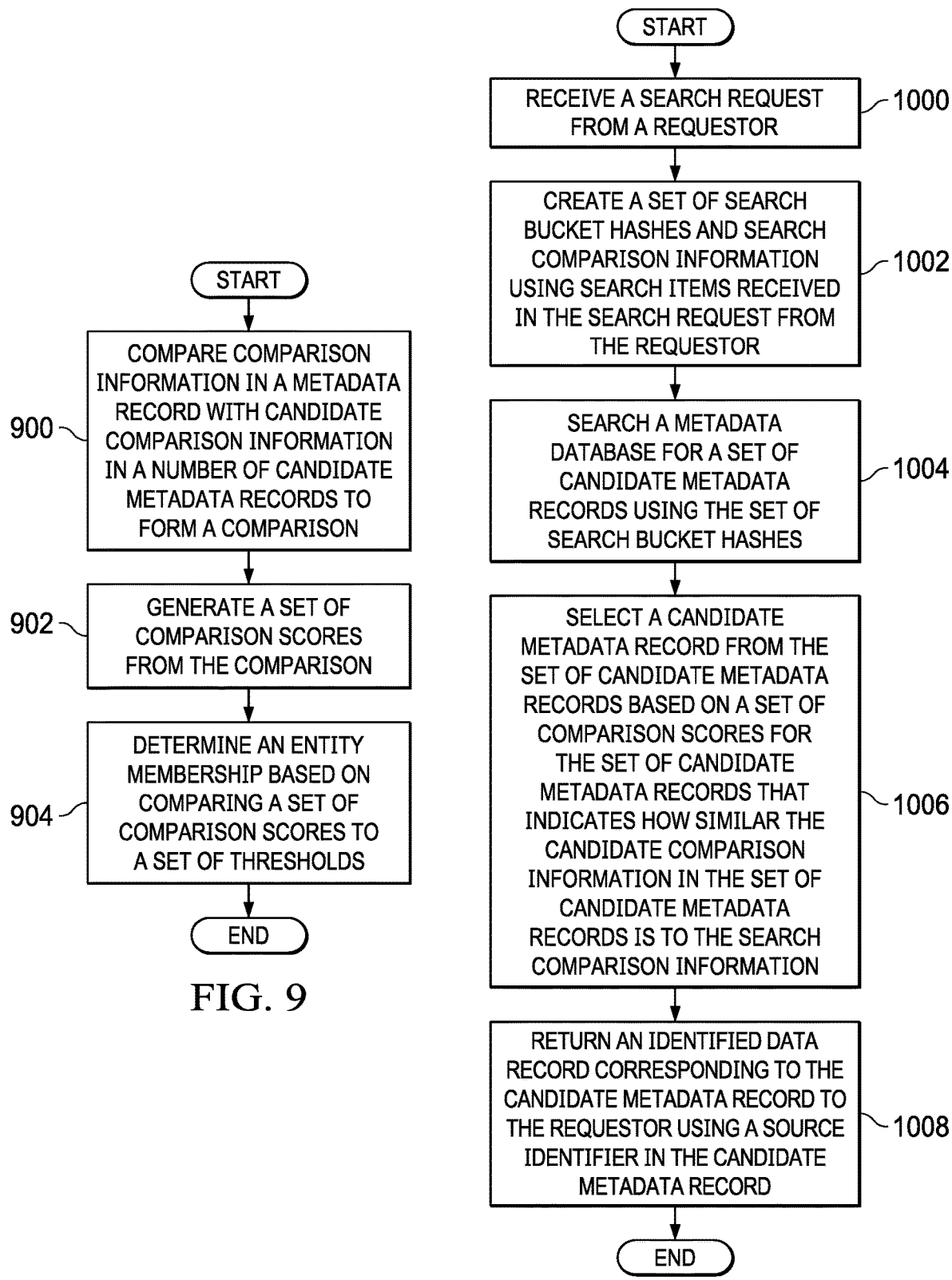

METADATA INDEXING FOR INFORMATION MANAGEMENT USING BOTH DATA RECORDS AND ASSOCIATED METADATA RECORDS

BACKGROUND

1. Field

The disclosure relates generally to an improved computer system and, more specifically, to a method, apparatus, system, and computer program product for managing collections of data using a metadata index in a computer system.

2. Description of the Related Art

Amounts of data collected and stored by organizations are ever-increasing. For example, businesses may store data about products, services, customers, transactions, and other types of information. It is desirable to ensure that the latest and most accurate version of the information is present. This information may be located in different databases or other collections of information.

With large amounts of information, master data management solutions may be employed to work with this data to perform indexing, matching, and linking of data from different sources. A master data management system can be used as a central data management system to provide uses with a single trusted view of data. A master data management can provide accurate and comprehensive matching of data that helps overcome differences and errors that can occur in the different data sources. In matching data, record pairs from different sources can be compared to determine whether the record pairs matched and if the record pairs should be linked to each other. Record attributes in the records are compared to determine if they match. These record attributes can be, for example, a name, an address, a phone number, or other suitable information. Various comparison functions can be used to compare records for matching conditions such as an exact match, a distance, a phonetic, a partial matching, an n-gram, or some other condition. Scores can be generated based on the outcome of these types of comparisons. For example, some scores can be made for each attribute and combined based on statistically determined relative weights to determine whether records sufficiently match each other to be linked.

SUMMARY

According to one embodiment of the present invention, a method manages information. A set of bucket hashes and comparison information for a data record is identified by a computer system. The set of bucket hashes is generated from the comparison information, wherein the set of bucket hashes and the comparison information form a metadata record. A number of candidate metadata records in a metadata database is identified by the computer system using the set of bucket hashes, wherein the number of candidate metadata records comprises a set of candidate bucket hashes and candidate comparison information. An entity membership is identified by the computer system for the data record from a comparison of the comparison information in the metadata record with the candidate comparison information in the number of candidate metadata records.

According to another embodiment of the present invention, an information management system comprises a computer system and a metadata database stored in the computer system. Metadata records in the metadata database each comprise a set of bucket hashes, comparison information, and an entity membership, wherein the set of bucket hashes is generated using the comparison information and the entity membership identifies a set of related metadata records.

According to yet another embodiment of the present invention, a computer program product for managing information comprises a computer-readable storage media with first program code, second program code, and third program code stored on the computer-readable storage media. The first program code is executable by a computer system to cause the computer system to identify a set of bucket hashes and comparison information for a data record, wherein the set of bucket hashes is generated from the comparison information, and wherein the set of bucket hashes and the comparison information form a metadata record. The second program code is executable by the computer system to cause the computer system to identify a number of candidate metadata records in a metadata database using the set of bucket hashes, wherein the number of candidate metadata records comprises candidate bucket hashes and candidate comparison information. The third program code is executable by the computer system to cause the computer system to determine an entity membership for the data record from a comparison of the comparison information in the metadata record with the candidate comparison information in the number of candidate metadata records.

BRIEF DESCRIPTION OF THE DRAWINGS

FIG. 6 is an illustration of a metadata record in accordance with an illustrative embodiment;

FIG. 9 is a flowchart of a process for determining entity membership in accordance with an illustrative embodiment;

FIG. 10 is a flowchart of a process for managing information in accordance with an illustrative embodiment;

DETAILED DESCRIPTION

Figure 1:
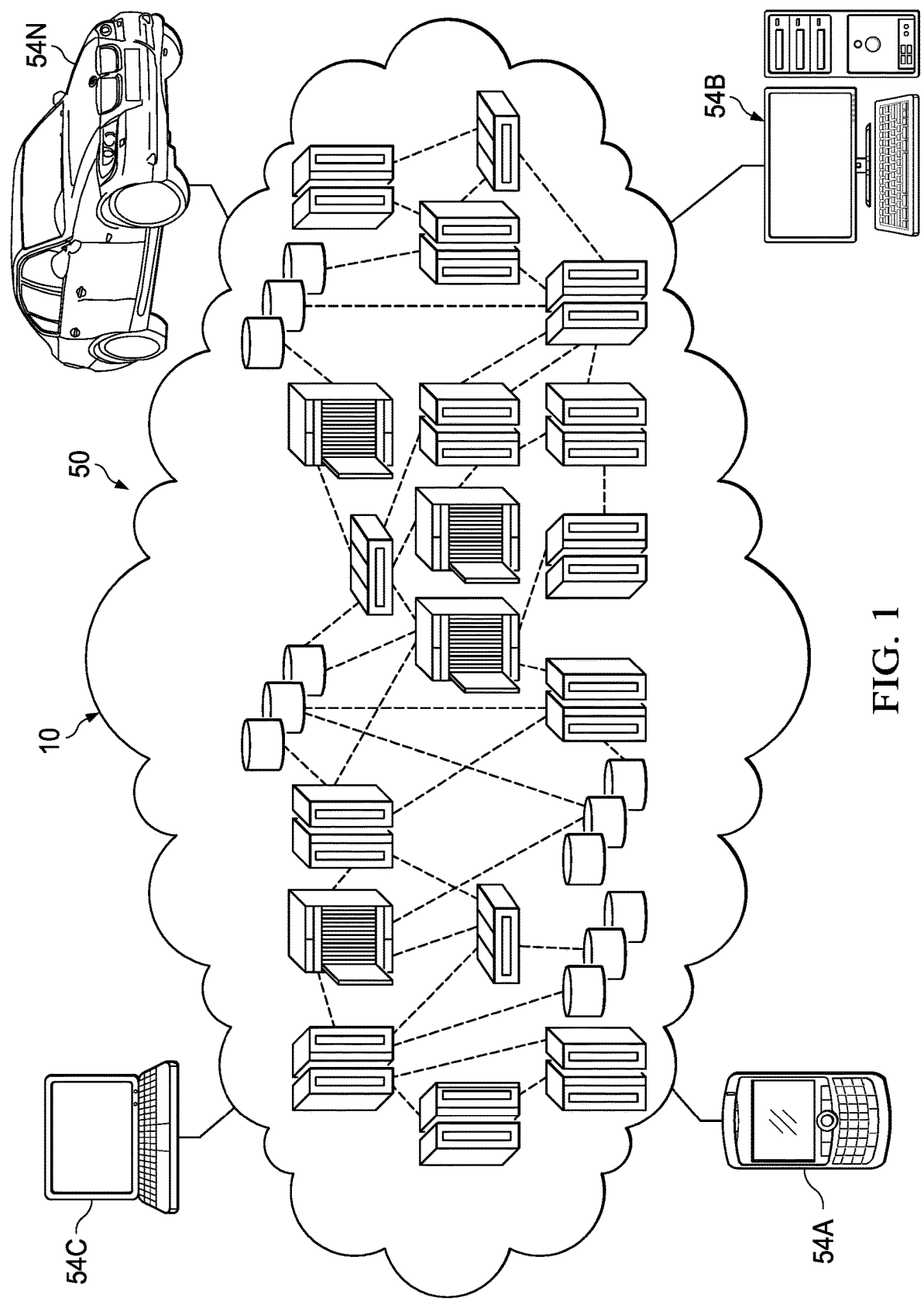
FIG. 1 is a cloud computing environment in accordance with an illustrative embodiment.

The present invention may be a system, a method, and/or a computer program product at any possible technical detail level of integration. The computer program product may include a computer-readable storage medium (or media)

having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that in a process of matching information, records go through a process of candidate selection. Candidates records selected are records that are suspected of being duplicate records. The illustrative embodiments recognize and take into account that the candidate selection is followed by a comparison of the candidate records to make a decision of linking or unlinking records.

The illustrative embodiments recognize and take into account that, historically, candidate selection has been a very expensive task because this process involves scanning through a large amount of data in the form of bucket hashes. The illustrative embodiments recognize and take into account that obtaining the comparison data for the selected candidate records is necessary in the process and can be a significantly costly process. The illustrative embodiments recognize and take into account that the efficiency of a matching process depends on the efficiency of the candidate selection and the retrieval of comparison data for those candidates. As a result, the illustrative embodiments recognize and take into account that each of the steps involves searching and retrieving records from a database.

Thus, the illustrative embodiments recognize and take into account that it is desirable to reduce a number of database accesses in processing data records to identify matches and generate links. The illustrative embodiments recognize and take into account that access to three types of columns in a row in a database can be used to reduce accesses in which one column contains bucket hashes, a second column contains comparison strings, and a third column contains linking information for records. In one illustrative example, a single index is used to facilitate faster matching capabilities. This index is a collection of data in the form of a database in which metadata records are contained and may also be referred to as a database. Each metadata record includes a set of bucket hashes and a comparison string. The metadata record can also include an entity membership. The entity membership is a field that includes an identifier for the data record. Other data records with the same identifier are considered to be linked.

As used herein, a "set of," when used with reference to items, means one or more items. For example, a "set of bucket hashes" is one or more bucket hashes.

Thus, the illustrative embodiments recognize and take into account that it would be desirable to have a system that has an improved indexing mechanism for matching metadata. In one illustrative example, a method, apparatus, computer system, and computer program product manage information. A set of bucket hashes and comparison information for a data record is identified by a computer system. The set of bucket hashes is generated from the comparison information, wherein the set of bucket hashes and the comparison information form a metadata record. A number of candidate metadata records in a metadata database is identified by the computer system using the set of bucket hashes, wherein the number of candidate metadata records comprises a set of candidate bucket hashes and candidate comparison information. An entity membership is identified by the computer system for the data record from a comparison of the comparison information in the metadata record with the candidate comparison information in the number of candidate metadata records.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustration of cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 in cloud computing environment 50 can communicate with any type of computerized device over any type of network and/or network addressable connection (e.g., using a web browser).

Figure 2:
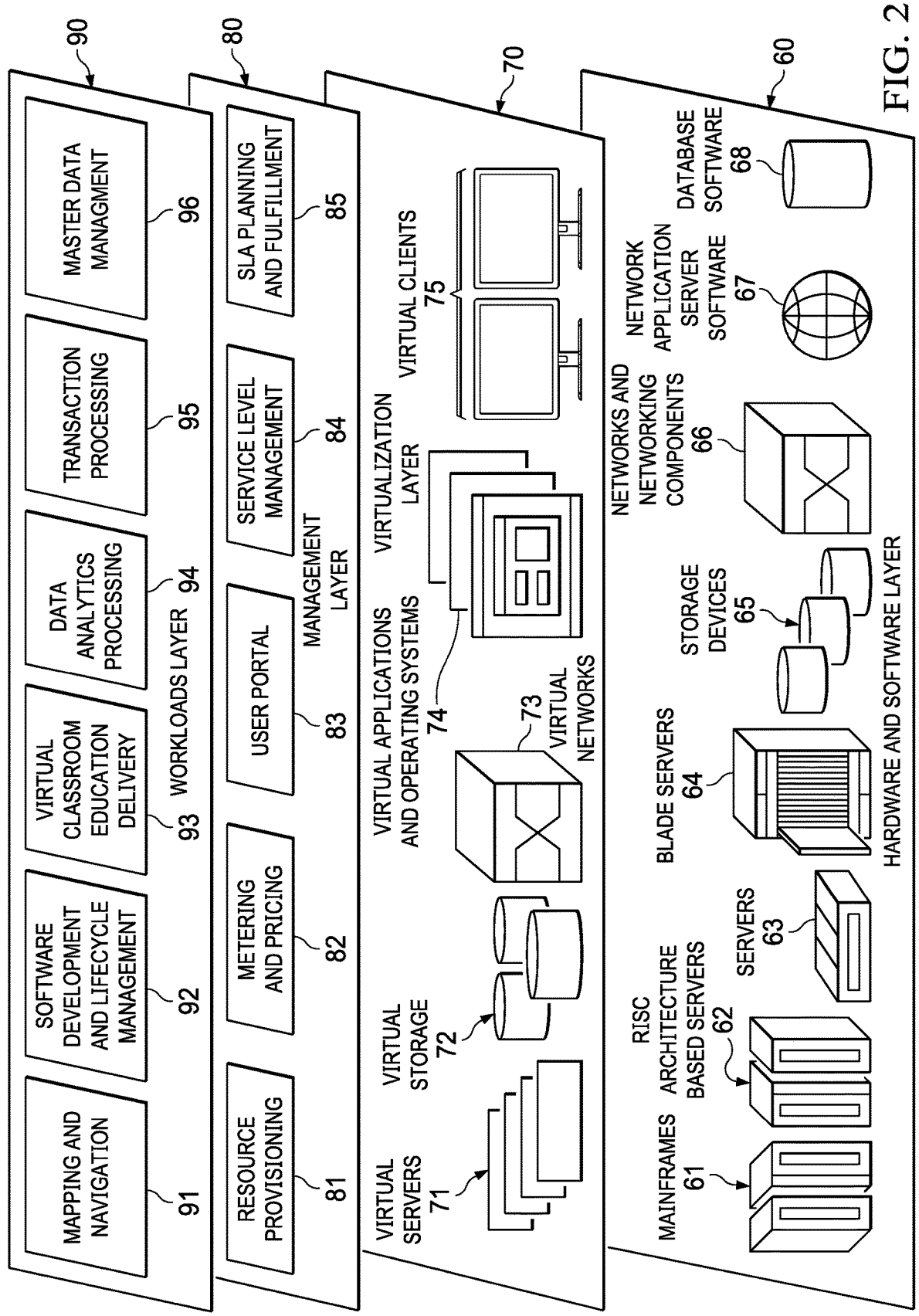
FIG. 2 is an illustration of abstraction model layers in accordance with an illustrative embodiment.

Referring now to FIG. 2, a set of functional abstraction layers provided by cloud computing environment 50 in FIG. 1 is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and master data management 96. Master data management 96 provides a service for managing information in cloud computing environment 50 in FIG. 1 or a network in a physical location that accesses cloud computing environment 50 in FIG. 1. For example, master data management 96 can be used to manage multiple copies of information that may be located in different repositories. Master data management 96 can operate to maintain a single version of the truth across all copies of the information for an entity. In this example, single version of the truth (SVOT) involves storing data for an entity in a consistent nonredundant form.

Figure 3:
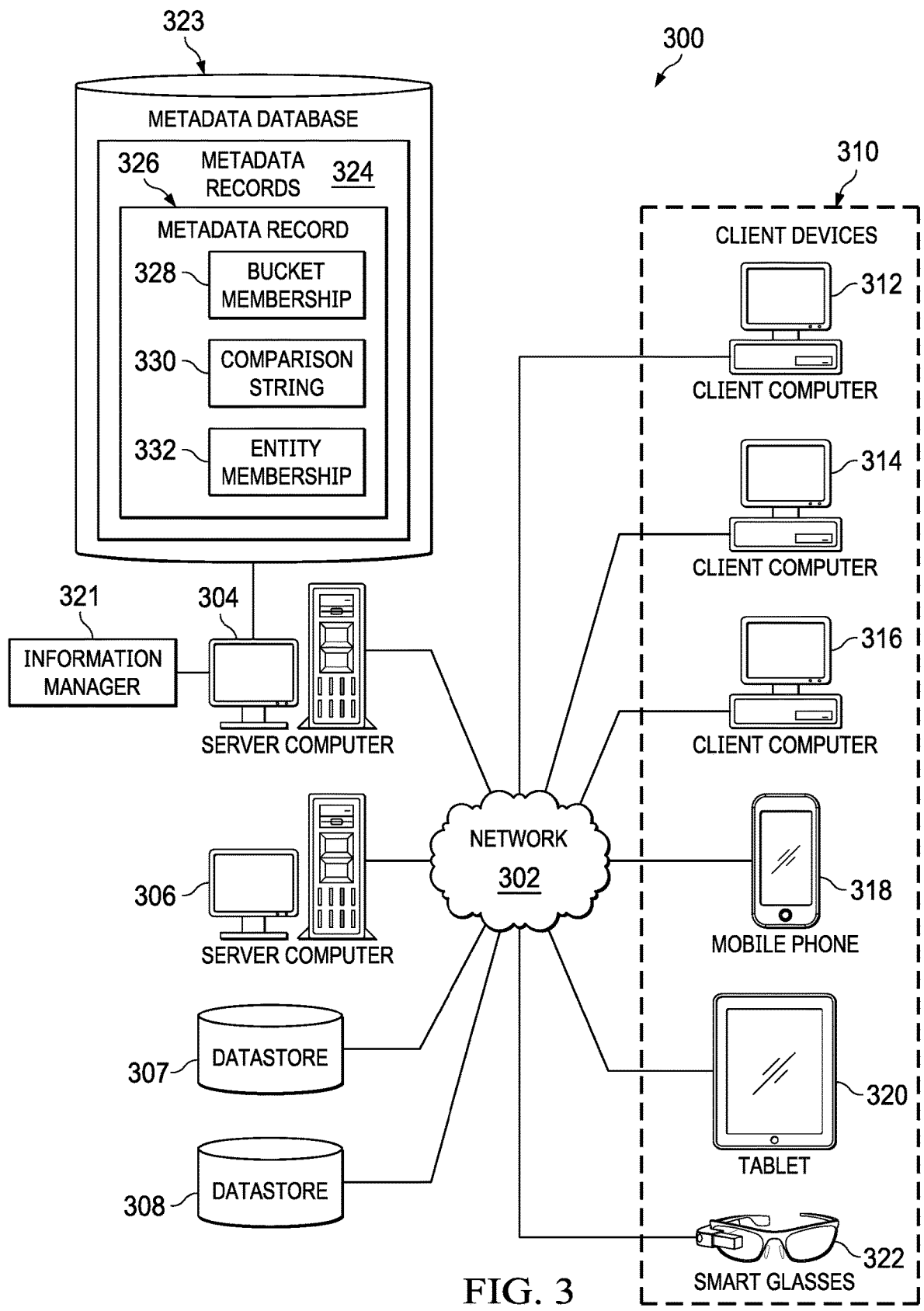
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with datastore 307 and datastore 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, datastore 307, datastore 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Datastore 307 and datastore 308 are hardware systems and function as repositories for at least one of storing, managing, or distributing information. These datastores can store information such as customer information, transactions, inventory information, portfolios, business plans, and other information. Information can be stored in databases located in datastore 307 and datastore 308. These databases can take various forms. For example, the databases can be selected from at least one of a graph database, a non-relational distributed database, a relational database, or other types of databases.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, information manager 321 can operate to manage information located in datastore 307 and datastore 308. In this illustrative example, information manager 321 can identify duplicate copies of the information, perform data deduplication, or confirm accuracy between different copies of the information. For example, information manager 321 can compare and match the information in these different locations to perform data deduplication as well as other functions in managing the information. The information can be stored in records in databases or other types of collections of information. In this illustrative example, information manager 321 uses metadata database 323 to perform steps such as identifying a candidate selection of data records, performing a comparison of candidate data records, and determining whether to link the data records.

In this illustrative example, metadata records 324 are configured to increase the speed and efficiency at which these steps can be performed. For example, metadata records 324 are designed to reduce the number of tables or databases that are accessed in performing steps such as candidate selection, comparison, and linking or unlinking steps. For example, metadata record 326 in metadata records 324 includes bucket membership 328, comparison string 330, and entity membership 332. Bucket membership 328 comprises bucket hashes that are generated using comparison string 330. Entity membership 332 is a unique identifier that identifies records that are linked to each other.

In other words, all of the metadata records in metadata records 324 that are linked to each other have the same unique identifier for entity membership 332. The linked records can be for an entity such as, for example, a person, an organization, a corporation, a government entity, a household, an account, or some other type of entity.

In this depicted example, the information needed to identify candidates, compare candidates, and link or unlink data records is found in a single metadata record in metadata records 324. In this manner, multiple accesses to different databases are avoided. As a result, a reduction in the number of accesses can increase the speed at which data records can be processed. Time savings increase as the number of data records increases. For example, large amounts of time can be saved when processing large amounts of records such as 3,000,000,000 records.

The illustration of the example in FIG. 3 is not meant to limit the manner in which other illustrative examples can be implemented. For example, information can be located in other locations in addition to or in place of datastore 307 and datastore 308. For example, the information managed by information manager 321 can also be located in at least one of server computer 304, server computer 306, or a set of client devices 310.

Figure 4:
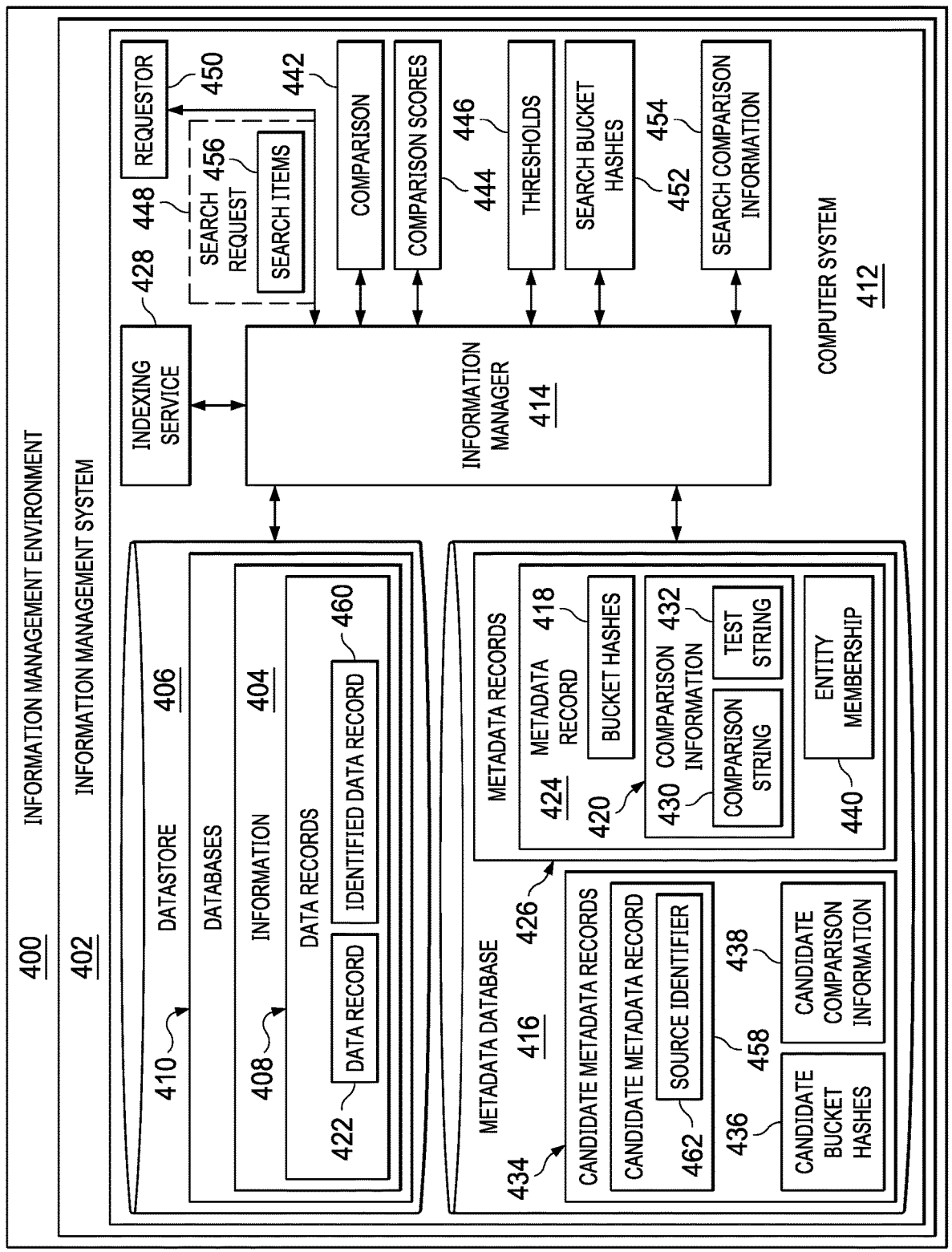
FIG. 4 is a block diagram of an information management environment in accordance with an illustrative embodiment.

With reference now to FIG. 4, a block diagram of an information management environment is depicted in accordance with an illustrative embodiment. In this illustrative example, information management environment 400 includes components that can be implemented in hardware such as the hardware shown in network data processing system 100 in FIG. 1.

As depicted, information management system 402 can operate to manage information 404 in datastore 406. In this example, datastore 406 is a hardware system that functions to persistently store and manage collections of information 404. Datastore 406 can include information repositories selected from at least one of a database, a file, a document, a spreadsheet, or some other suitable form. Datastore 406 can be in a single location or can be distributed in many locations on different computers or storage systems.

In one illustrative example, information 404 in the form of data records 408 is stored in a set of databases 410 in datastore 406. As depicted, a database is a data structure that stores information in an organized manner. The database can include multiple tables. The different tables can represent different types of information such as products, financial records, employees, or other information. In this example, data records 408 are stored in the different tables in the set of databases 410.

As depicted, information management system 402 comprises computer system 412 and information manager 414. Information manager 414 is located in computer system 412.

Information manager 414 can be implemented in software, hardware, firmware or a combination thereof. When software is used, the operations performed by information manager 414 can be implemented in program code configured to run on hardware, such as a processor unit. When firmware is used, the operations performed by information manager 414 can be implemented in program code and data and stored in persistent memory to run on a processor unit. When hardware is employed, the hardware may include circuits that operate to perform the operations in information manager 414.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 412 is a physical hardware system and includes one or more data processing systems. When more than one data processing system is present in computer system 412, those data processing systems are in communication with each other using a communications medium. The communications medium can be a network. The data processing systems can be selected from at least one of a computer, a server computer, a tablet computer, or some other suitable data processing system.

In this illustrative example, information manager 414 can perform a number of different steps in managing information 404 such as data records 408 in the set of databases 410. Management of data records 408 can be formed using metadata database 416.

For example, information manager 414 can identify a set of bucket hashes 418 and comparison information 420 for data record 422 in data records 408. In this example, the set of bucket hashes 418 and comparison information 420 for data record 422 forms metadata record 424 in metadata records 426 in metadata database 416. In this illustrative example, information manager 414 can identify this information by receiving the set of bucket hashes 418 and comparison information 420 for data record 422 received from indexing service 428.

In this illustrative example, indexing service 428 can be a bulk indexing service that can generate bucket hashes 418 for large numbers of data records 408. Indexing service 428 can also identify comparison information 420 from data records 408. As depicted, indexing service 428 can be a function or process in a currently available master data management system in one illustrative example.

In this example, the set of bucket hashes 418 is generated from comparison information 420. A bucket hash in bucket hashes 418 is a value generated by applying a hashing function to one or more pieces of comparison information 420. In this example, the set of bucket hashes 418 can be based on comparison information 420 that is selected from at least one of a first name, a last name, an address, a street name, a state, a zip code, a residence city, a phone number, an occupation, a business name, a birthdate, an account number, an occupation, a business telephone, a business address, or a tax identification number.

Further, multiple bucket hashes can be generated in the set of bucket hashes 418 for a single data record, and each bucket hash in the multiple bucket hashes can represent only a portion of a field or attribute in the data record. For example, with a zip code of 12345, three bucket hashes can be generated. For example, the first bucket hash can be generated by applying a hashing function to "123", a second bucket hash can be generated by applying the same hashing function to "234", and a third bucket hash can be generated by applying the same hashing function to "345". This type of bucket hash generation can be referred to as n-gram based bucketing.

As a result, multiple bucket hashes can be generated in the set of bucket hashes 418 for a field or attribute in a single data record in which each of the bucket hashes represents only a portion of a field or attribute in the data record. In this manner, partial matches can be identified to take into account potential data entry errors. This type of multiple bucket hash generation can be applied to other types of information in a data record such as a telephone number, a birthdate, or other suitable information.

Comparison information 420 can take a number of different forms. For example, comparison information 420 can be at least one of comparison string 430 or text string 432 representing information 404 in data record 422. In this illustrative example, comparison string 430 can be text with formatting or syntax added that is used or recognized by a particular comparison or matching process. For example, the location or position of text within comparison string 430 may indicate the particular type of information in data record 422. The particular type of information can also be referred to as an attribute.

Further, syntax can be added that is expected by the particular comparison or matching process. As depicted, text string 432 can be text obtained from data record 422 without formatting or any particular syntax.

In this illustrative example, the set of bucket hashes 418 and comparison information 420 form metadata record 424 that can be stored in metadata database 416. Metadata database 416 can also be referred to as an index. As a result, each data record in the data records of interest can be processed to generate metadata records 426 in metadata database 416.

As depicted, information manager 414 can identify a number of candidate metadata records 434 in metadata database 416 using the set of bucket hashes 418. For example, information manager 414 can search for metadata records 426 that include a bucket hash in metadata record 424 to identify the number of candidate metadata records 434. This type of search can be performed for each of the set of bucket hashes 418 in metadata record 424 to find the number of candidate metadata records 434. In this manner, a search for data records 408 that may be related to data record 422 can be performed using metadata records 426.

The number of candidate metadata records 434 can comprise a set of candidate bucket hashes 436 and candidate comparison information 438.

Additionally, information manager 414 can determine entity membership 440 for data record 422 from comparison 442 of comparison information 420 in metadata record 424 with candidate comparison information 438 in the number of candidate metadata records 434. Comparison 442 can include a score that indicates the likelihood that a match is present between metadata record 424 and other metadata records in metadata records 426.

In this manner, a determination can be made as to the likelihood that data record 422 represented by data record 422 is the same or sufficiently similar to other data records in data records 408. When the likelihood is that data record 422 is the same or sufficiently similar to other data records in data records 408, a match is considered to be present.

The score can include sub parts or sub scores indicating the probability of matches between different portions of data record 422. These different portions can be fields or attributes in data record 422. For example, a portion can be at least one of a first name, a last name, an address, a street name, a state, a zip code, a residence city, a phone number, an occupation, a business name, a birthdate, an account number, an occupation, a business telephone, a business address, a tax identification number, or some other suitable piece of information found in a portion of a data record.

For example, in determining entity membership 440, information manager 414 can compare comparison information 420 in metadata record 424 with candidate comparison information 438 in the number of candidate metadata records 434 to form comparison 442. Information manager 414 can generate a set of comparison scores 444 from comparison 442. Information manager 414 can determine entity membership 440 based on comparing the set of comparison scores 444 to a set of thresholds 446.

In this illustrative example, the set of thresholds 446 can be a set of values such as a set of percentages. If comparison scores 444 have a percentage indicating how close a match is present for a particular attribute or for all of the comparison information, comparison information 420 in metadata record 424 can be considered a match to each candidate metadata record in the number of candidate metadata records 434 for which the set of comparison scores 444 meets or exceeds the set of thresholds 446.

In this illustrative example, entity membership 440 in metadata record 424 for data record 422 can be updated to have the same unique identifier as one or more other metadata records in metadata records 426 for data records 408 that are considered to be a match. In another illustrative example, entity membership 440 in metadata record 424 can have a value indicating that data record 422 corresponding to metadata record 424 is unique and not a match to another data record in data records 408. In this illustrative example, this linking of data records 408 can be performed by information manager 414 updating entity memberships in metadata records 426 to indicate the linking between data records 408. For example, information manager 414 can update metadata record 424 with entity membership 440 determined for data record 422 from comparison 442 with candidate metadata records 434. The update can be to include the unique identifier that is used for candidate metadata records 434 that match metadata record 424.

With metadata records 426 in metadata database 416 that have been processed to determine entity memberships, this database can be used to search for data records 408 in the set of databases 410 in datastore 406. A similar process can be made using incoming data records or search items in search requests.

For example, information manager 414 can receive search request 448 from requestor 450. In this example, requestor 450 can be a user in the form of a human operator or a process or program running on a computer.

Information manager 414 can create a set of search bucket hashes 452 and search comparison information 454 using search items 456 received in search request 448 from requestor 450. Information manager 414 can search metadata database 416 for the set of candidate metadata records 434 using the set of search bucket hashes 452.

Information manager 414 can determine whether candidate metadata record 458 from the set of candidate metadata records 434 is a match for search items 456 based on a set of comparison scores 444 for the set of candidate metadata records 434 that indicate how similar candidate comparison information 438 in the set of candidate metadata records 434 are to search comparison information 454. Information manager 414 can return identified data record 460 in data records 408 corresponding to metadata record 424 to requestor 450 using source identifier 462 in candidate metadata record 458.

In one illustrative example, features that overcome a problem with time and processing resources needed to analyze information such as data records may be present in one or more databases for other types of repositories. In one illustrative example, information manager 414 can operate to perform processes for data deduplication to match information such as information 404 located in data records 408. Metadata database 416 can be used to reduce the amount of searches in databases or tables to match data records 408.

In the illustrative example, metadata such as bucket hashes 418 and comparison information 420 is present in metadata records 426 in metadata database 416. In the depicted example, metadata records 426 are generated for data records 408 for which comparisons are desired. In this example, each metadata record in metadata records 426 includes a set of bucket hashes 418 and comparison information 420 that has been generated for a corresponding data record in data records 408.

In the illustrative example, a search can be performed in metadata records 426 for matching bucket hashes 418 in metadata records 426 to identify candidate metadata records 434 that may be potentially linked to each other. Each candidate metadata record includes a set of bucket hashes 418 and comparison information 420. When a comparison of comparison information 420 is made, additional queries to a database are unnecessary because comparison information 420 is present in data record 422 along with the set of bucket hashes 418.

Further, when comparisons result in a match between comparison information 420 for data records 408, entity membership 440 for these data records in corresponding metadata records 426 can be updated to link two of data records 408 to each other. Further, this process can also be used to update entity membership 440 in metadata records 426 to unlink corresponding ones of data records 408.

In this manner, a reduction in the number of database accesses occurs as compared to currently used techniques. As a result, metadata records 426 in metadata database 416 form an index that can be used to match metadata for data records 408.

These metadata data records can be used to search for data records 408. For example, when search request 448 is received, information manager 414 can generate search bucket hashes 452 and search comparison information 454 from search items 456 in search request 448. This information can be used to find candidate metadata records 434 and then perform comparisons using search comparison information 454 and candidate comparison information 438. When a match is found with one or more of candidate metadata records 434, source identifiers in those candidate metadata records can be used by information manager 414 to perform at least one of locating or returning data records 408 that are responsive to search request 448.

Computer system 412 can be configured to perform at least one of the steps, operations, or actions described in the different illustrative examples using software, hardware, firmware, or a combination thereof. As a result, computer system 412 operates as a special purpose computer system in which information manager 414 in computer system 412 enables managing information 404 including updating entity memberships to link or unlink data records 408 using a process that reduces the time and resources needed to perform comparisons. In particular, information manager 414 transforms computer system 412 into a special purpose computer system as compared to currently available general computer systems that do not have information manager 414 that uses metadata database 416 for comparing information 404 and data records 408.

In the illustrative example, the use of information manager 414 in computer system 412 integrates processes into a practical application for managing information 404 that increases the performance of computer system 412. In other words, information manager 414, using metadata database 416 in computer system 412, is directed to a practical application of processes integrated into information manager 414 in computer system 412 that identifies data records 408 that are considered to be matches to each other using metadata records 426 in metadata database 416. In this illustrative example, information manager 414 in computer system 412 provides a practical application of information management such that the functioning of computer system 412 is improved as compared to current techniques.

Thus, the illustrative example provides a metadata architecture that facilitates more efficient selection of candidates and comparison of the candidates. Further, the structure of the metadata records reduces large bucket problems with current techniques and enables obtaining data which has a correlation between multiple buckets. Further, this design also enables retrieving candidate metadata records from multiple buckets based on the bucket hashes in a single pass as opposed to being performed one by one with current techniques.

Figure 5:
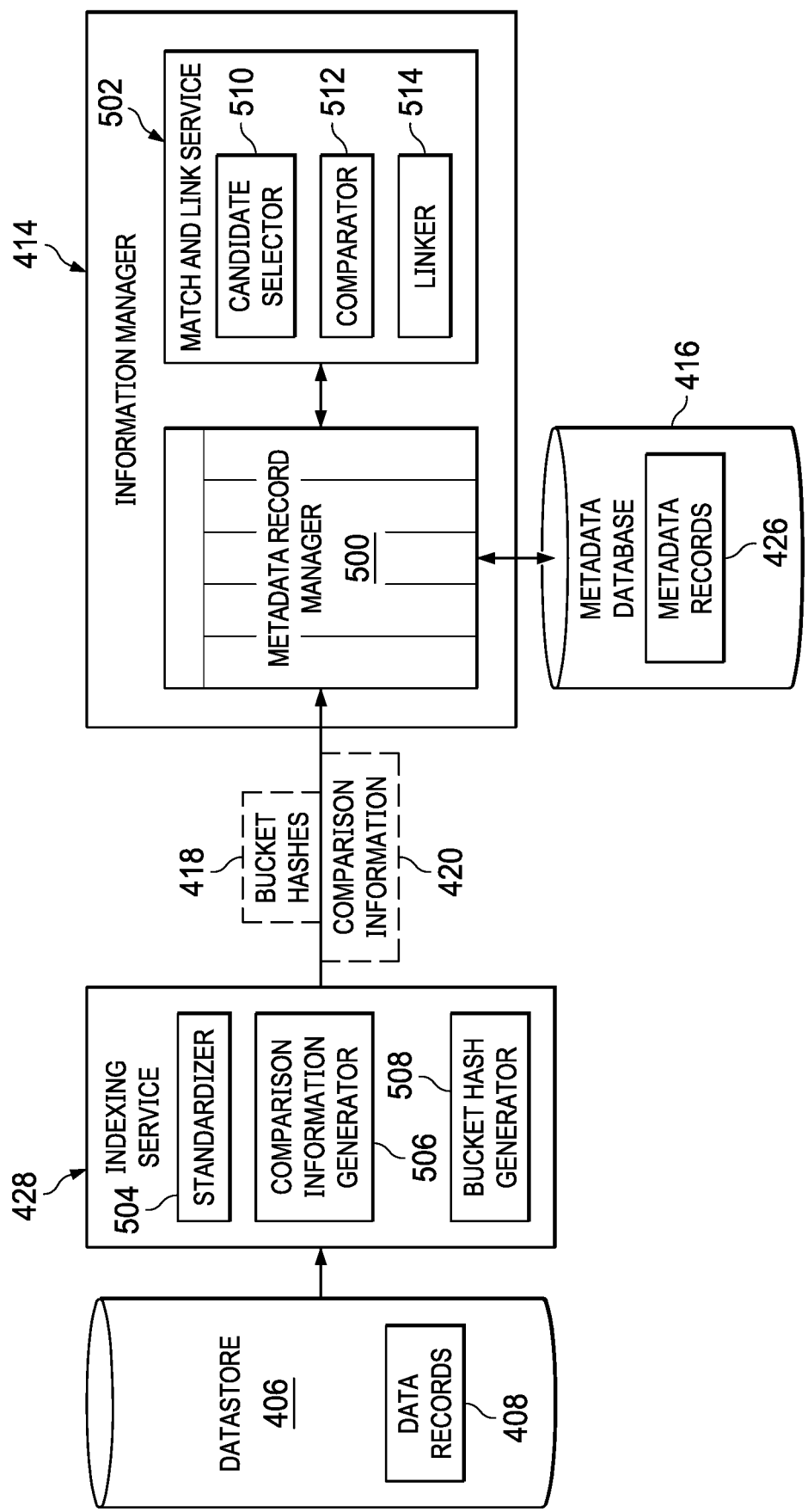
FIG. 5 is an illustration of a dataflow for matching records using an information manager in accordance with an illustrative embodiment.

Turning now to FIG. 5, an illustration of a dataflow for matching records using an information manager is depicted in accordance with an illustrative embodiment. In the illustrative examples, the same reference numeral may be used in more than one figure. This reuse of a reference numeral in different figures represents the same element in the different figures.

In this illustrative example, information manager 414 includes a number of different components. As depicted, information manager 414 includes metadata record manager 500 and match and link service 502.

In this illustrative example, data records 408 in datastore 406 can be processed by indexing service 428. Indexing service 428 can be a bulk indexing service that can process large portions or all of data records 408. In this illustrative example, indexing service 428 includes standardizer 504, comparison information generator 506, and bucket hash generator 508.

Standardizer 504 can generate comparison information and, as part of the comparison information generation, can standardize information in data records 408. For example, names can be standardized by standardizer 504. In one example, the names "Bob," "Robert," and "William" can be standardized to "Bob" such that each instance of "Robert" and "William" are changed to "Bob" for purposes of generating bucket hashes and comparison information. As another example, phonetic standardization can be performed in which "Richard" and "Richerd" can be standardized to a phonetic representation of "r IH ch er d" by standardizer 504. As depicted, comparison information generator 506 can generate comparison information for each data record such as comparison strings that include at least one of formatting or syntax used by a comparison process.

In this illustrative example, bucket hash generator 508 can generate bucket hashes based on comparison information 420. For example, bucket hash generator 508 can generate bucket hashes 418 for each data record using standardized terms generated by standardizer 504, and comparison information generator 506 can be used to generate comparison strings in comparison information 420 by comparison information generator 506.

Indexing service 428 sends bucket hashes 418 and comparison information 420 to metadata record manager 500 in information manager 414. As depicted, metadata record manager 500 can generate metadata records 426 using bucket hashes 418 and comparison information 420. As a result, a metadata record in metadata records 426 in metadata database 416 is present for each corresponding data record process by indexing service 428.

In this illustrative example, metadata record manager 500 can be implemented using a number of different types of processes. For example, metadata record manager 500 can include a search engine such as an ElasticSearch search engine. This type of search engine can generate an index of metadata records 426 in metadata database 416. This indexing of metadata can increase the speed and efficiency in which searching for candidate metadata records can be performed.

In this illustrative example, match and link service 502 includes a number of different components. As depicted, match and link service 502 comprises candidate selector 510, comparator 512, and linker 514.

Candidate selector 510 can search for candidate metadata records 434 that are candidates for linking to a metadata record that is being processed to identify matching metadata records. This searching can be performed using bucket hashes 418. For example, each bucket hash in a metadata record can be used to search for other metadata records that include that bucket hash. Data records having matching bucket hashes are candidate metadata records 434 returned from metadata records 426 in metadata database 416.

As depicted, comparator 512 can compare candidate comparison information 438 in candidate metadata records 434 with comparison information 420 in metadata record 424 for data record 422 being processed. This comparison is performed without needing to perform another access to metadata database 416 or another database to obtain the comparison information. In this example, candidate comparison information 438 is located in candidate metadata records 434 along with candidate bucket hashes 436. As a result, an additional database access to search for comparison information is unnecessary in this example using metadata records 426. In this example, comparator 512 can take into account syntactic similarities between different data records with a same meaning. This comparison can be performed using an equivalence function.

When one or more matches are identified, linker 514 can update the entity membership for one or more candidate metadata records that match the metadata record being processed. This update can be made in candidate metadata records 434 in FIG. 4 returned in the initial search for bucket hashes 418. As a result, an additional access to a database for entity memberships is unnecessary. This update can be to link or unlink data records 408 to each other by updating the entity membership in the metadata records being processed.

In this manner, data records 408 can be processed and linked in a manner that reduces at least one of the number of database accesses or time needed to process data records 408. When duplicate data records are identified, data duplication or other steps can then be performed.

The illustration of information management environment 400 and the different components in information management environment 400 in FIG. 4 and FIG. 5 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, metadata record 424 can include other information in other fields in addition to the set of bucket hashes 418 and comparison information 420. For example, metadata record 424 can include attributes or fields for at least one of an entity membership, a customer identifier, a record type, a probabilistic self-score, a time stamp, or other suitable information. The entity membership is an identifier that can be used to link records. A customer identifier can identify a customer. In this example, a record type is an identifier of a type or category for a record, such as for a person or an organization. Based on the type of record, different comparison functions can be used. As a result, the record type can be used to determine how to perform matching on that type of data.

In the depicted example, a probabilistic self-score is a self-comparison score of a record. This score can show strength of the record. For example, if a record has more attributes, a self-comparison score for this record can be higher that compared to a record with a lesser number of attributes. This score can be to perform some analytics on source data quality. The source with records of higher self-scores is richer than a source with records of lower self-scores. A time stamp indicates when metadata record 424 was last updated.

In another illustrative example, information manager 414 can identify bucket hashes 418 and comparison information 420 by generating the information from data records 408. As another example, datastore 406 can be located in another computer system in addition to computer system 412.

With reference to FIG. 6, an illustration of a metadata record is depicted in accordance with an illustrative embodiment. Metadata record 600 is an example of one manner in which metadata record 424 in FIG. 4 can be implemented.

In the illustrative example, metadata record 600 comprises a number of different attributes. As depicted, metadata records 600 comprises internal record identifier 602, source identifier 604, bucket hashes 606, comparison strings 608, entity membership 610, and text search 612.

Internal record identifier 602 is a unique identifier that uniquely identifies metadata record 600 within a metadata database. Source identifier 604 can be used to locate the data record corresponding to metadata record 600. For example, source identifier 604 can include, for example, an identifier of the source and a record identifier. The record identifier and other information such as a repository identifier, a database identifier, an IP address, or other suitable information can be used to locate the data record corresponding to metadata record 600.

Bucket hashes 606 are bucket hashes generated using comparison information such as at least one of comparison strings 608 or text search 612. As depicted, bucket hashes 606 in metadata record 600 may be searched against bucket hashes in other metadata records.

In this depicted example, comparison string 608 is an example of comparison information. Comparison string 608 contains text with at least one of formatting or syntax that is used by a process that can be used to compare data records. Comparison string 608 can be a concatenated text representation of the data record. With comparison string 608, text-based searching functions in a search engine used for a metadata database can be leveraged to perform faster identification of candidate metadata records that have a sufficient level of matching. In this illustrative example, the matching can be formed such that comparison scores are generated and used to determine whether a sufficient number of terms match to consider the metadata record to be a match to a candidate metadata record.

In this example, text search 612 contains terms that are not in any particular formatting or syntax. Text search 612 can be used for searching by a search engine such as an ElasticSearch search engine.

In this illustrative example, entity membership 610 comprises an identifier that links metadata records to each other and in turn links the data records represented by those metadata records. Each metadata record for a data record that is a match has the same value for entity membership 610. In some cases, a data record may be unique and not have any matching data records. In that case, entity membership 610 in the metadata record corresponding to the data record is unique within the metadata records.

Figures 7, 8:
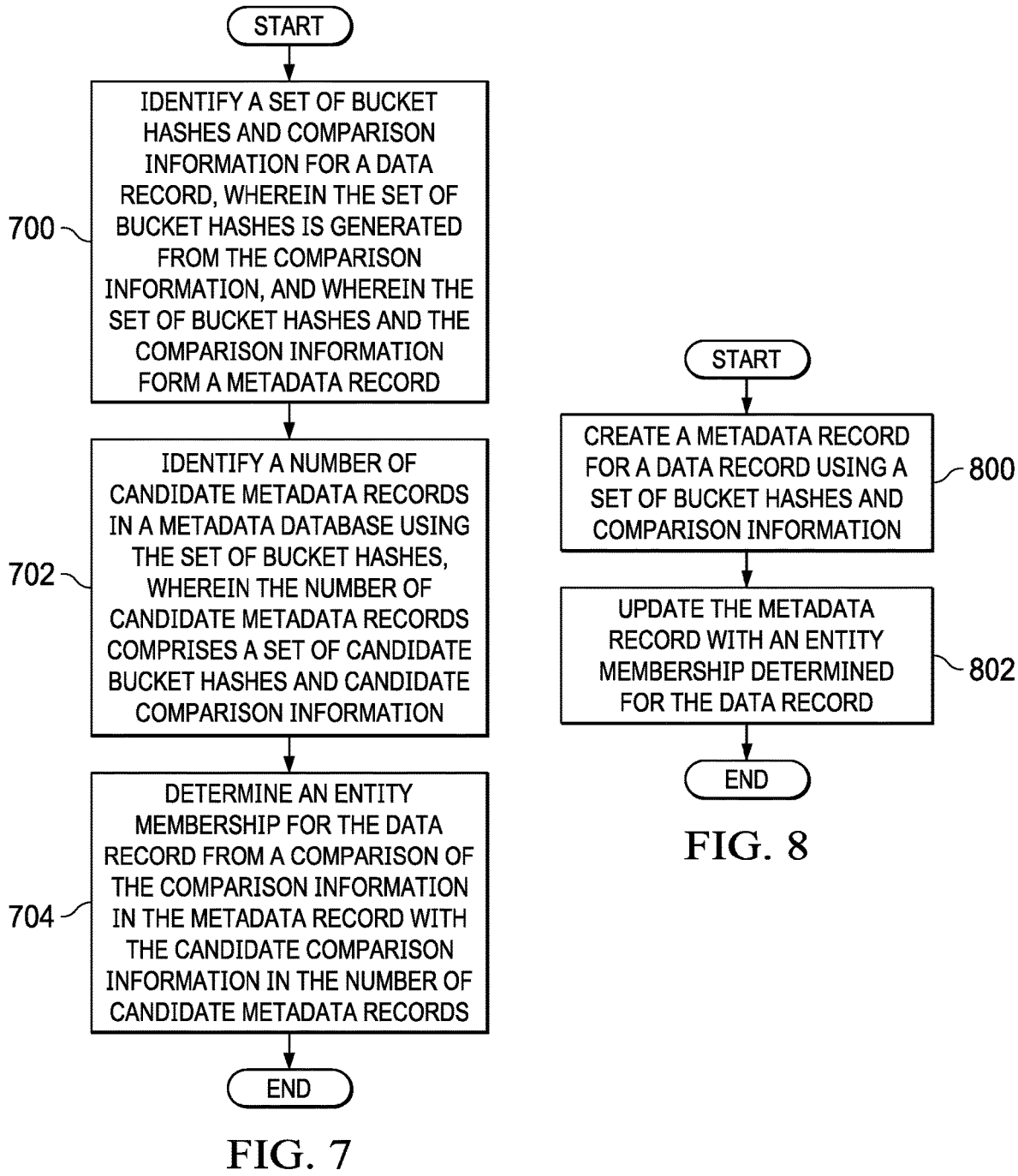
FIG. 7 is a flowchart of a process for managing information in accordance with an illustrative embodiment.
FIG. 8 is a flowchart of a process for managing information in accordance with an illustrative embodiment.

Turning next to FIG. 7, a flowchart of a process for managing information is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in information manager 414 in computer system 412 in FIG. 4.

The process begins by identifying a set of bucket hashes and comparison information for a data record, wherein the set of bucket hashes is generated from the comparison information, and wherein the set of bucket hashes and the comparison information form a metadata record (step 700). The process identifies a number of candidate metadata records in a metadata database using the set of bucket hashes, wherein the number of candidate metadata records comprises a set of candidate bucket hashes and candidate comparison information (step 702). The process determines an entity membership for the data record from a comparison of the comparison information in the metadata record with the candidate comparison information in the number of candidate metadata records (step 704). The process terminates thereafter.

With reference to FIG. 8, a flowchart of a process for managing information is depicted in accordance with an illustrative embodiment. The process in FIG. 8 depicts additional steps that can be performed in the process in FIG. 7 to manage information.

The process creates a metadata record for a data record using a set of bucket hashes and comparison information (step 800). Step 800 can be performed at any time during the different steps in FIG. 7.

The process updates the metadata record with an entity membership determined for the data record (step 802). The process terminates thereafter. Step 802 can be performed after the entity membership is determined in step 704 in FIG. 7.

Turning now to FIG. 9, a flowchart of a process for determining an entity membership is depicted in accordance with an illustrative embodiment. The process in this figure is an example of one manner in which step 704 in FIG. 7 can be implemented.

The process begins by comparing comparison information in a metadata record with candidate comparison information in a number of candidate metadata records to form a comparison (step 900). The process generates a set of comparison scores from the comparison (step 902). In this illustrative example, a comparison score can be generated for each candidate record identified. Further, the set of comparison scores can include sub comparison scores in which each sub comparison score is for a particular attribute or field that may be identified in the candidate comparison information. For example, syntax can be used in which the order of strings or labels can be present to identify attributes or fields for comparison to generate sub comparison scores in the comparison scores. The scores can then be aggregated with weighting to generate a comparison score for the overall metadata record. Weighting can be assigned to give some attributes more weight in determining whether a match is present.

The process determines an entity membership based on comparing the set of comparison scores to a set of thresholds (step 904). The process terminates thereafter.

With reference to FIG. 10, a flowchart of a process for managing information is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in information manager 414 in computer system 412 in FIG. 4. In this flowchart, the process can be used to search for data records using metadata records in a metadata database.

The process begins by receiving a search request from a requestor (step 1000). The process creates a set of search bucket hashes and search comparison information using search items received in the search request from the requestor (step 1002). The set of search bucket hashes is generated using the search items in the search request. In a similar fashion, comparison information can also be generated using the search items in the search request.

The process searches a metadata database for a set of candidate metadata records using the set of search bucket hashes (step 1004). The process selects a candidate metadata record from the set of candidate metadata records based on a set of comparison scores for the set of candidate metadata records that indicates how similar the candidate comparison information in the set of candidate metadata records is to the search comparison information (step 1006).

The process returns an identified data record corresponding to the candidate metadata record to the requestor using a source identifier in the candidate metadata record (step 1008). The process terminates thereafter. The identified data record can be identified using information in the candidate metadata record. For example, the candidate metadata record can include a source identifier. The source identifier includes information that can be used to identify the location of the data record to be returned. This information can include, for example, a repository identifier, a record identifier for the database in which the data record is located, or other suitable information.

Figure 11:
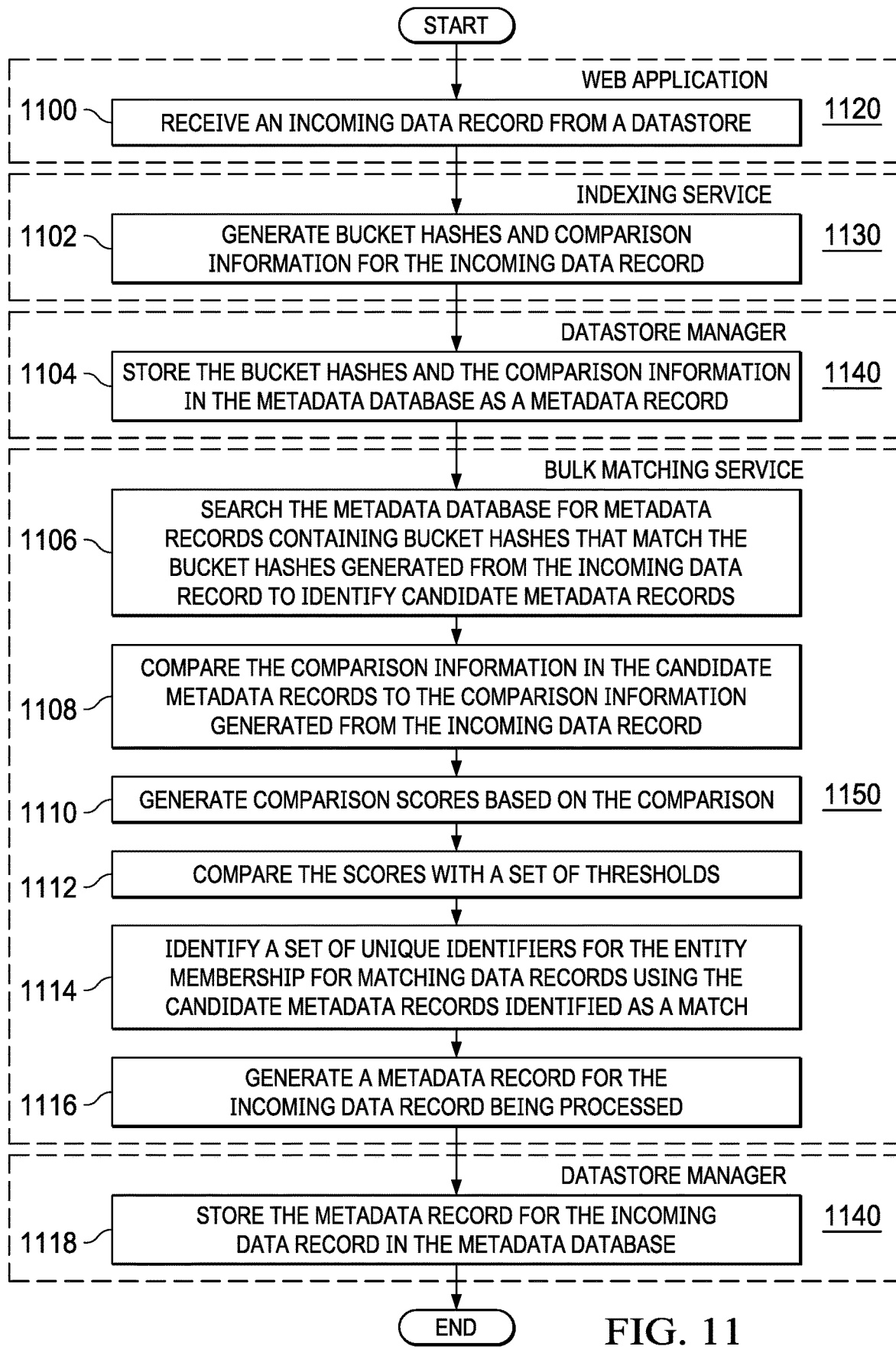
FIG. 11 is a flowchart of a process for generating a metadata database for linking of data records in accordance with an illustrative embodiment.

Turning next to FIG. 11, a flowchart of a process for generating a metadata database for linking of data records is depicted in accordance with an illustrative embodiment. This metadata database can also be referred to as a matching index.

The process in FIG. 11 can be implemented in hardware, software, or both. When implemented in software, the process can take the form of program code that is run by one or more processor units located in one or more hardware devices in one or more computer systems. For example, the process can be implemented in information manager 414 in computer system 412 in FIG. 4.

The process begins by receiving an incoming data record from a datastore (step 1100). The datastore can be any suitable backend store or database. For example, the datastore can be Janus Graph, Cloudant, Hbase, or DB2 database. In this depicted example, step 1100 can be performed by web application 1120. Web application 1120 can operate as a persistent layer and is independent from indexing service 1130 and bulk matching service 1150.

The process generates bucket hashes and comparison information for the incoming data record (step 1102). In this example, step 1102 is performed by indexing service 1130 that can receive the data record from web application 1120. For example, web application 1120 can make a Representational State Transfer (REST) application interface (API) call to request a bulk indexing service to generate metadata for the data record. In this example, indexing service 1130 can be a scalable bulk driven process capable of reading incoming records, standardizing data, creating comparison strings, and creating bucket hashes for each of the incoming data record to support downstream statistical matching. In addition, indexing service 1130 can also create a text representation of the incoming data record for text-based indexing or rapid search.

The process stores the bucket hashes and the comparison information in the metadata database as a metadata record (step 1104). In this example, step 1104 can be performed by datastore manager 1140, which can operate to manage metadata records in the metadata database. The metadata database can be a datastore which follows a specific data storage format such as a columnar format or a row-based format. In this illustrative example, a columnar database can be used with index support, and generated information for the incoming data records are stored in same row. As depicted, datastore manager 1140 can perform a search for similar data records for the incoming data records before downstream analysis to improve efficiency. In this illustrative example, the preliminary search may be based on any search engine, for example, ElasticSearch or SOLR search engine.

In the illustrative example, bulk matching service 1150 performs steps 1106-1116. Bulk matching service 1150 can be a scalable spark based matching engine deployed in a containerized environment.

The process searches the metadata database for metadata records containing bucket hashes that match the bucket hashes generated from the incoming data record to identify candidate metadata records (step 1106). In step 1106, the candidate metadata records contain metadata for corresponding data records. For example, the candidate metadata records contain bucket hashes and comparison information that can be compared to the bucket hashes in the comparison information generated from the incoming data record.

The process compares the comparison information in the candidate metadata records to the comparison information generated from the incoming data record (step 1108). In this illustrative example, a pairs wise comparison can be conducted between the comparison information for a candidate to a data record in the comparison information generated from the incoming data record. The comparison information for the incoming data record and the comparison information in the metadata records can be compared to form the comparison.

The process generates comparison scores based on the comparison (step 1110). The process then compares the scores with a set of thresholds (step 1112). In this illustrative example, a threshold in step 1112 can be a predefined threshold. This threshold can be a configurable value defined at a system level. An optimal value for the threshold can be selected based on different trials and testing by data stewards.

With this comparison, candidate metadata records for which the comparison score meets or exceeds the predefined threshold can be considered a match for purposes of linking the data records corresponding to the candidate metadata records with the incoming data record being processed. The process identifies a set of unique identifiers for the entity membership for matching data records using the candidate metadata records identified as a match (step 1114).

The process then generates a metadata record for the incoming data record being processed (step 1116). In step 1116, the metadata record includes the bulk hashes and comparison information generated from the incoming data record. Further, this metadata record also includes a unique identifier for the entity membership in which the unique identifier is the same identifier as the unique identifiers in the candidate metadata records that have been identified as having a match from the comparison. The metadata record can also include a source identifier that identifies the source of the incoming data record. This source identifier can be information used to retrieve the data record from the source.

The process stores the metadata record for the incoming data record in the metadata database (step 1118). The process terminates thereafter. This step can be performed by datastore manager 1140.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
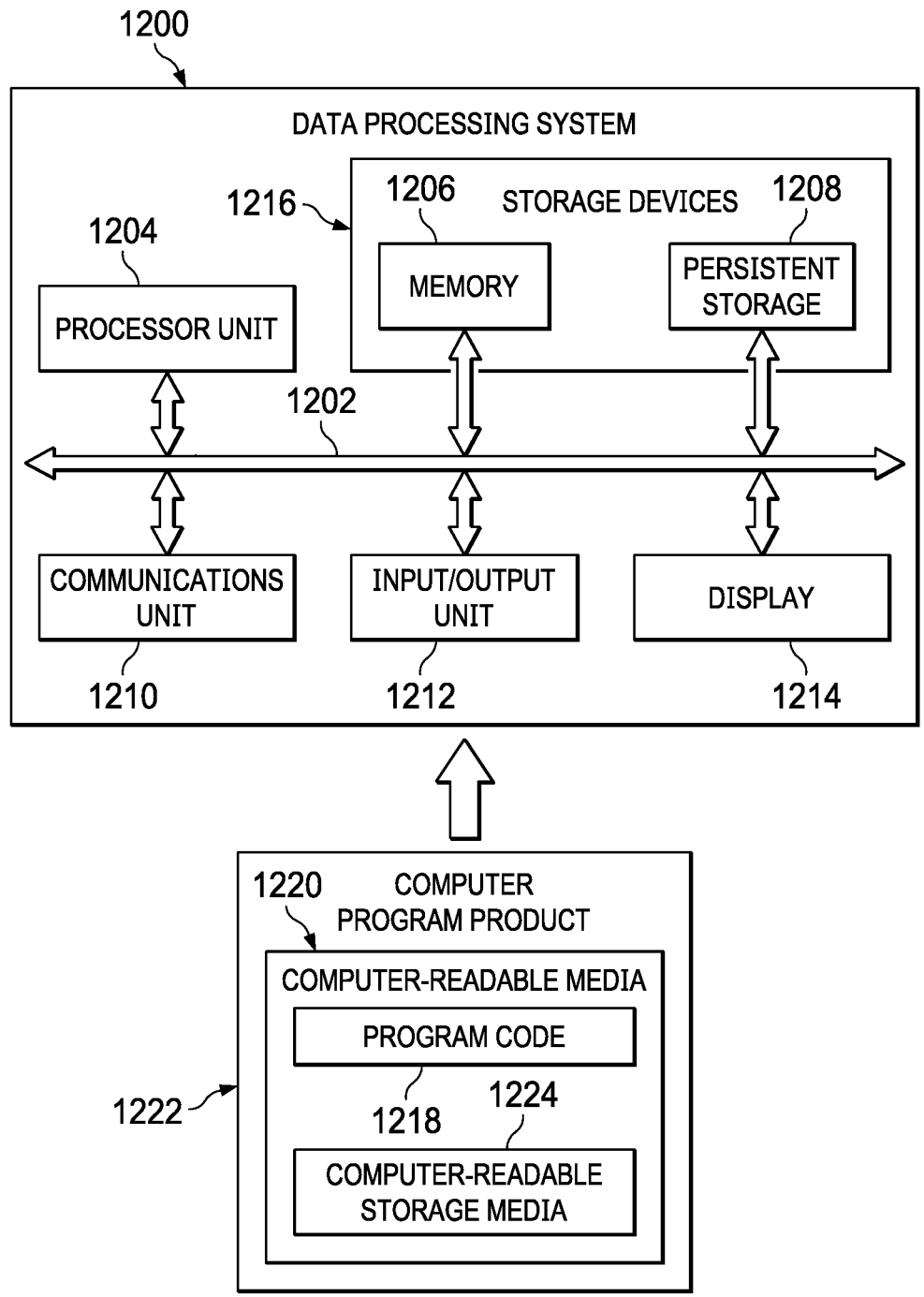
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, and client devices 110 in FIG. 1. Data processing system 1200 can also be used to implement computer system 412. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218. Computer-readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1218 can be transferred to data processing system 1200 using a computer-readable signal media. The computer-readable signal media are signals and can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

Thus, the illustrative embodiments of the present invention provide a computer-implemented method, computer system, and computer program product for managing information. In one illustrative example, a set of bucket hashes and comparison information for a data record is identified by a computer system. The set of bucket hashes is generated from the comparison information, wherein the set of bucket hashes and the comparison information form a metadata record. A number of candidate metadata records in a metadata database is identified by the computer system using the set of bucket hashes, wherein the number of candidate metadata records comprises a set of candidate bucket hashes and candidate comparison information. An entity membership is identified by the computer system for the data record from a comparison of the comparison information in the metadata record with the candidate comparison information in the number of candidate metadata records.

The metadata records in the metadata database enable at least one of faster searching or less database accesses in comparing data records to determine whether the data records are matches. In the illustrative example, metadata records include bucket hashes and comparison information. Additionally, the metadata records can also include entity membership information. As a result, a search can be performed to identify metadata records with bucket hashes matching a metadata record that is being processed. The metadata records returned are candidate metadata records for comparison. In the illustrative example, these metadata records can also include the comparison information. As a result, the comparisons can be made with the results already returned in the initial search without performing another search to obtain the comparison information. Further, when matches are identified, updates to link the metadata records can be made to the metadata record being processed or to the candidate metadata records that have already been returned without forming another search.

Additionally, the illustrative examples can also include information such as a source identifier and a source record identifier in the metadata record to increase the speed at which the data record can be located. As a result, the number of searches is reduced and can also save time needed to process many data records.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for managing information, the method comprising:
   identifying, by a computer system, a set of bucket hashes and comparison information for a data record maintained in a datastore, wherein the set of bucket hashes is generated from the comparison information, wherein each bucket hash in the set of bucket hashes is a value generated by applying a hashing function to at least one piece of the comparison information, and wherein the set of bucket hashes and the comparison information form a metadata record maintained in a metadata database;
   identifying, by the computer system, a number of candidate metadata records in the metadata database using the set of bucket hashes, wherein the number of candidate metadata records comprises a set of candidate bucket hashes and candidate comparison information;
   determining, by the computer system, an entity membership for the data record from a comparison of the comparison information in the metadata record with the candidate comparison information in the number of candidate metadata records;
   receiving, by the computer system, a search request from a requestor;
   creating, by the computer system, a set of search bucket hashes and search comparison information using search items received in the search request from the requestor;
   searching, by the computer system, the metadata database for a set of candidate metadata records using the set of search bucket hashes;
   selecting, by the computer system, a candidate metadata record from the set of candidate metadata records based on a set of comparison scores for the set of candidate metadata records that indicates how similar the candidate comparison information in the set of candidate metadata records is to the search comparison information; and
   returning, by the computer system, an identified data record corresponding to the candidate metadata record to the requestor using a source identifier in the candidate metadata record, wherein the set of bucket hashes and the comparison information that form the metadata record for the data record are received from an indexing service that generated the set of bucket hashes and the comparison information for the data record.

2. The method of claim 1, further comprising:
   creating, by the computer system, the metadata record for the data record using the set of bucket hashes and the comparison information; and
   updating, by the computer system, the metadata record with the entity membership determined for the data record.

3. The method of claim 1, wherein determining, by the computer system, the entity membership for the metadata record from the comparison of the comparison information in the metadata record with the candidate comparison information in the number of candidate metadata records comprises:
   comparing, by the computer system, the comparison information in the metadata record with the candidate comparison information in the number of candidate metadata records to form a comparison;
   generating, by the computer system, a set of comparison scores from the comparison; and
   determining, by the computer system, the entity membership based on comparing the set of comparison scores to a set of thresholds.

4. The method of claim 1, wherein multiple bucket hashes are generated in the set of bucket hashes for a single data record, and each of the multiple bucket hashes represents only a portion of an attribute in the single data record.

5. The method of claim 1, wherein the comparison information of the metadata record comprises at least one of a comparison string or a text string representing information in the data record.

6. The method of claim 1, wherein a bucket hash in the set of bucket hashes is a value generated by applying a hashing function to at least one portion of the comparison information of the metadata record, and wherein the set of bucket hashes of the metadata record is based on at least one of a first name, a last name, an address, a street name, a state, a zip code, a residence city, a phone number, an occupation, a business name, a birthdate, an account number, a business telephone, a business address, or a tax identification number.

7. The method of claim 1, wherein the metadata record further comprises an entity membership that is a unique identifier that identifies which ones of other metadata records maintained in the metadata database are linked to the metadata record.

8. An information management system comprising:
   a computer system; and
   a metadata database stored in the computer system, wherein metadata records in the metadata database each comprise a set of bucket hashes, comparison information, and an entity membership, wherein the set of bucket hashes is generated using the comparison information and the entity membership identifies a set of related metadata records, wherein each bucket hash in the set of bucket hashes is a value generated by applying a hashing function to at least one piece of the comparison information, wherein the computer system receives a search request from a requestor; creates a set of search bucket hashes and search comparison information using search items received in the search request from the requestor; searches the metadata database for a set of candidate metadata records using the set of search bucket hashes; selects a candidate metadata record from the set of candidate metadata records based on a set of comparison scores for the set of candidate metadata records that indicates how similar candidate comparison information in the set of candidate metadata records is to the search comparison information; and returns an identified data record corresponding to the candidate metadata record to the requestor using a source identifier in the metadata record, wherein the set of bucket hashes and the comparison information that form the metadata record for the data record are received from an indexing service that generated the set of bucket hashes and the comparison information for the data record.

9. The information management system of claim 8, wherein the computer system identifies the set of bucket hashes and the comparison information for a data record maintained in a datastore, wherein the set of bucket hashes and the comparison information form a metadata record maintained in the metadata database; identifies a number of candidate metadata records in the metadata database using the set of bucket hashes in which the number of candidate metadata records comprises candidate bucket hashes and the candidate comparison information; and determines an entity membership for the data record from a comparison of the comparison information in the metadata record with candidate comparison information in the number of candidate metadata records.

10. The information management system of claim 9, wherein the computer system creates the metadata record for the data record using the set of bucket hashes and the comparison information and updates the metadata record with the entity membership determined for the data record.

11. The information management system of claim 9, wherein in determining the entity membership for the metadata record from the comparison of the comparison information in the metadata record with the candidate comparison information in the number of candidate metadata records, the computer system compares the comparison information in the metadata record with the candidate comparison information in the number of candidate metadata records to form a comparison; generates a set of comparison scores from the comparison; and
determines the entity membership based on comparing the set of comparison scores to a set of thresholds.

12. The information management system of claim 9, wherein the metadata record further comprises an entity membership that is a unique identifier that identifies which ones of other metadata records maintained in the metadata database are linked to the metadata record.

13. The information management system of claim 8, wherein the comparison information of the metadata record comprises at least one of a comparison string or a text string representing information.

14. A computer program product for managing information, the computer program product comprising:
a computer-readable storage media;
first program code, stored on the computer-readable storage media, executable by a computer system to cause the computer system to identify a set of bucket hashes and comparison information for a data record maintained in a datastore, wherein the set of bucket hashes is generated from the comparison information, wherein each bucket hash in the set of bucket hashes is a value generated by applying a hashing function to at least one piece of the comparison information, and wherein the set of bucket hashes and the comparison information form a metadata record maintained in a metadata database;
second program code, stored on the computer-readable storage media, executable by the computer system to cause the computer system to identify a number of candidate metadata records in the metadata database using the set of bucket hashes, wherein the number of candidate metadata records comprises candidate bucket hashes and candidate comparison information;
third program code, stored on the computer-readable storage media, executable by the computer system to cause the computer system to determine an entity membership for the data record from a comparison of the comparison information in the metadata record with the candidate comparison information in the number of candidate metadata records;
fourth program code, stored on the computer-readable storage media, executable by the computer system to cause the computer system to receive a search request from a requestor;
fifth program code, stored on the computer-readable storage media, executable by the computer system to cause the computer system to create a set of search bucket hashes and search comparison information using search items received in the search request from the requestor;
sixth program code, stored on the computer-readable storage media, executable by the computer system to cause the computer system to search the metadata database for a set of candidate metadata records using the set of search bucket hashes;
seventh program code, stored on the computer-readable storage media, executable by the computer system to cause the computer system to select a candidate metadata record from the set of candidate metadata records based on a set of comparison scores for the set of candidate metadata records that indicates how similar the candidate comparison information in the set of candidate metadata records is to the search comparison information; and
eighth program code, stored on the computer-readable storage media, executable by the computer system to cause the computer system to return an identified data record corresponding to the candidate metadata record to the requestor using a source identifier in the candidate metadata record, wherein the set of bucket hashes and the comparison information that form the metadata record for the data record are received from an indexing service that generated the set of bucket hashes and the comparison information for the data record.

15. The computer program product of claim 14, further comprising:
program code, stored on the computer-readable storage media, executable by the computer system to cause the computer system to create the metadata record for the data record using the set of bucket hashes and the comparison information; and
program code, stored on the computer-readable storage media, executable by the computer system to cause the computer system to update the metadata record with the entity membership determined for the data record.

16. The computer program product of claim 14, wherein third program code comprises:
program code, stored on the computer-readable storage media, executable by the computer system to cause the computer system to compare the comparison information in the metadata record with the candidate comparison information in the number of candidate metadata records to form a comparison;
program code, stored on the computer-readable storage media, executable by the computer system to cause the computer system to generate a set of comparison scores from the comparison; and program code, stored on the computer-readable storage media, executable by the computer system to cause the computer system to determine the entity membership based on comparing the set of comparison scores to a set of thresholds.

\* \* \* \* \*